(12) United States Patent
Yamamiya

(10) Patent No.: US 12,080,119 B2
(45) Date of Patent: Sep. 3, 2024

(54) COIN SELECTOR AND AUTOMATIC SERVICE MACHINE

(71) Applicant: ASAHI SEIKO CO., LTD, Tokyo (JP)

(72) Inventor: Takahito Yamamiya, Saitama (JP)

(73) Assignee: ASAHI SEIKO CO., LTD, Tokyo (JP)

( * ) Notice: Subject to any disclaimer, the term of this patent is extended or adjusted under 35 U.S.C. 154(b) by 38 days.

(21) Appl. No.: 17/686,658

(22) Filed: Mar. 4, 2022

(65) Prior Publication Data

US 2022/0284754 A1    Sep. 8, 2022

(30) Foreign Application Priority Data

Mar. 8, 2021    (JP) .................................. 2021-36001

(51) Int. Cl.
  *G07D 9/00*    (2006.01)
  *G06Q 20/18*    (2012.01)
  (Continued)

(52) U.S. Cl.
  CPC .............. *G07D 9/00* (2013.01); *G06Q 20/18* (2013.01); *G07F 1/02* (2013.01); *G07D 5/00* (2013.01);
  (Continued)

(58) Field of Classification Search
  CPC ........ G07D 9/00; G07D 5/00; G07D 2201/00; G07D 2205/00; G07D 1/00; G07F 1/02; G07F 1/04
  See application file for complete search history.

(56) References Cited

U.S. PATENT DOCUMENTS 3,905,460 A * 9/1975 Greenwald ............... G07F 9/06
                                                        194/350
3,927,750 A * 12/1975 Greenwald ............... G07F 5/00
                                                        194/350
(Continued)

FOREIGN PATENT DOCUMENTS

EP          1659544          5/2006
EP          1 659 544 B1     8/2008
(Continued)

OTHER PUBLICATIONS

Extended European Search Report Issued in Corresponding EP Patent Application No. 22156457.8, dated Aug. 4, 2022.
(Continued)

*Primary Examiner* — Sonji N Johnson
*Assistant Examiner* — Asifa Habib
(74) *Attorney, Agent, or Firm* — Greenblum & Bernstein, P.L.C.

(57) ABSTRACT

A coin entering from a depositing port of a coin selector is identified by a denomination while passing through a coin passage. A coin of a predetermined denomination is stored, and a coin of a denomination other than the predetermined denomination is discharged to the outside. Provided is a coin selector including a removal mechanism that suitably removes a coin clogged in a coin passage. The coin selector includes a first pushing portion and a second pushing portion that push a coin in a moving direction of the coin and a direction intersecting with the moving direction in the coin passage from a depositing port for depositing the coin to a dispensing port for discharging the coin. When the coin is clogged, the coin is pushed by a pushing unit to eliminate the coin clogging, and the clogged coin is discharged to the dispensing port.

17 Claims, 17 Drawing Sheets

(51) Int. Cl.
*G07D 5/00* (2006.01)
*G07F 1/02* (2006.01)

(52) U.S. Cl.
CPC ..... *G07D 2201/00* (2013.01); *G07D 2205/00* (2013.01)

(56) References Cited

U.S. PATENT DOCUMENTS

| | | | | |
|---|---|---|---|---|
| 3,977,506 | A * | 8/1976 | McNally | G07F 5/08 194/235 |
| 4,096,933 | A * | 6/1978 | Massa | G07F 5/24 194/327 |
| 4,545,474 | A * | 10/1985 | Ridgley | G07F 5/00 194/350 |
| 4,662,501 | A * | 5/1987 | Partridge | G07D 5/02 194/344 |
| 5,647,469 | A * | 7/1997 | Yamagishi | G07F 1/046 194/200 |
| 6,098,778 | A * | 8/2000 | Yeh | G07D 5/00 194/321 |
| 6,125,987 | A * | 10/2000 | Abe | G07D 5/00 194/317 |
| 6,595,343 | B1 * | 7/2003 | Tanaka | G07F 1/04 194/344 |
| 6,786,408 | B2 * | 9/2004 | Yamagishi | G06K 7/0008 235/451 |
| 7,032,735 | B2 * | 4/2006 | Trenner | G07F 1/04 194/344 |
| 8,250,776 | B2 * | 8/2012 | Yoo | G06Q 50/06 68/3 R |
| 8,739,955 | B1 * | 6/2014 | Everhart | G07D 5/00 194/207 |
| 2004/0182679 | A1 * | 9/2004 | Trenner | G07F 1/04 194/344 |
| 2005/0087423 | A1 * | 4/2005 | Rasmussen | G07F 1/04 194/217 |
| 2009/0008215 | A1 * | 1/2009 | Bell | G07D 5/08 194/350 |
| 2013/0045793 | A1 * | 2/2013 | Cheng | G07D 5/00 194/302 |

FOREIGN PATENT DOCUMENTS

| | | |
|---|---|---|
| JP | 52-159293 | 12/1977 |
| JP | 1-175375 | 12/1989 |
| JP | 7-21440 | 1/1995 |
| JP | 9-509771 | 9/1997 |
| JP | 2001-338320 | 12/2001 |
| JP | 2008-307129 | 12/2008 |
| JP | 4446053 B2 | 4/2010 |

OTHER PUBLICATIONS

Office Action issued in Corresponding JP Patent Application No. 2021-036001, dated Jul. 3, 2023, along with an English translation thereof.

* cited by examiner

COIN SELECTOR AND AUTOMATIC SERVICE MACHINE

BACKGROUND OF THE INVENTION

1. Field of the Invention

The present invention relates to a coin selector that identifies a denomination of deposited money and an automatic service machine equipped with the coin selector.

2. Description of the Related Art

In general, circulating money issued by a nation includes coins of a plurality of denominations. Since the size, design, material, and the like of the coins are changed for each denomination, anyone can easily identify the denomination thereof. Since each denomination has a different feature, the denomination can be identified by a machine. Therefore, a coin selector that identifies the denomination of money has been considered.

For example, a coin selector described in JP-B-4446053 (Patent Literature 1) is known.

The coin selector includes a guide rail that guides a coin and side walls disposed at both sides of the guide rail. A detection sensor that detects the authenticity and denomination of the coin is disposed at the side wall. Features of the coin inserted from a depositing port are detected by the detection sensor while the coin moves on the guide rail.

In order to prevent coin clogging, the coin selector is configured such that an upper side of the side wall on one side is pivotally supported and a lower side of the side wall is opened. A reject passage connected to a coin return port is disposed at the lower side of the side wall. When the lower side of the side wall is opened, a coin clogged in the passage is dropped into the reject passage and is discharged to the return port.

A portion of the coin passage where the detection sensor is disposed constitutes a cylindrical slot body in which detection coils are attached to the side walls on both sides of the guide rail. In order to eliminate the clogging when a coin is clogged in the slot body, the coin selector includes a plate-shaped canceller that advances in the slot body from a direction opposite to a rolling direction of the coin. The canceller moves in conjunction with an operation of a cancel lever operated by a user, and the coin in the slot body can be pushed out by a top end of the canceller. The pushed-out coin is dropped into the reject passage and discharged to the return port.

In the coin selector in the related art, the coin clogged in the cylindrical slot body in which the detection coils are attached to the side walls on both sides is discharged by advancing the plate-shaped body from the direction opposite to the rolling direction of the coin so that the coin clogging is eliminated. When moisture, oil, or the like adheres to the coin or when the coin is charged, the coin may stick to the wall of the coin passage. Therefore, the coin stuck on the side wall of the coin passage may move while being stuck along the side wall, and may not be removed. In the coin selector in the related art, the coin may be clogged in the coin passage disposed downstream of a door portion swung by the cancel lever.

SUMMARY OF THE INVENTION

A coin selector of the invention includes: an identification unit configured to identify a denomination of a coin entering from a depositing port; a storage port configured to discharge a coin of a predetermined denomination; a dispensing port configured to discharge a coin of a denomination other than the predetermined denomination; a gate disposed in the middle of a path along which a coin moves between the depositing port and the dispensing port, and the gate branching a course of the coin to the storage port or the dispensing port; and a pushing portion configured to push the coin in the middle of the path of the coin from the identification unit to the gate.

An automatic service machine of the invention includes: the coin selector; a selection button configured to select a product; a storage portion configured to store a product; a discharge portion configured to discharge a product; and a control unit configured to control the coin selector, the selection button, and the discharge portion. When the deposit amount in the coin selector satisfies a fee corresponding to the product selected by the selection button, the product selected by the selection button is provided under control of the control unit.

The coin selector of the invention can suitably remove the coin clogged in the coin passage and discharge the coin to the dispensing port.

DESCRIPTION OF THE PREFERRED EMBODIMENTS

Figure 1:
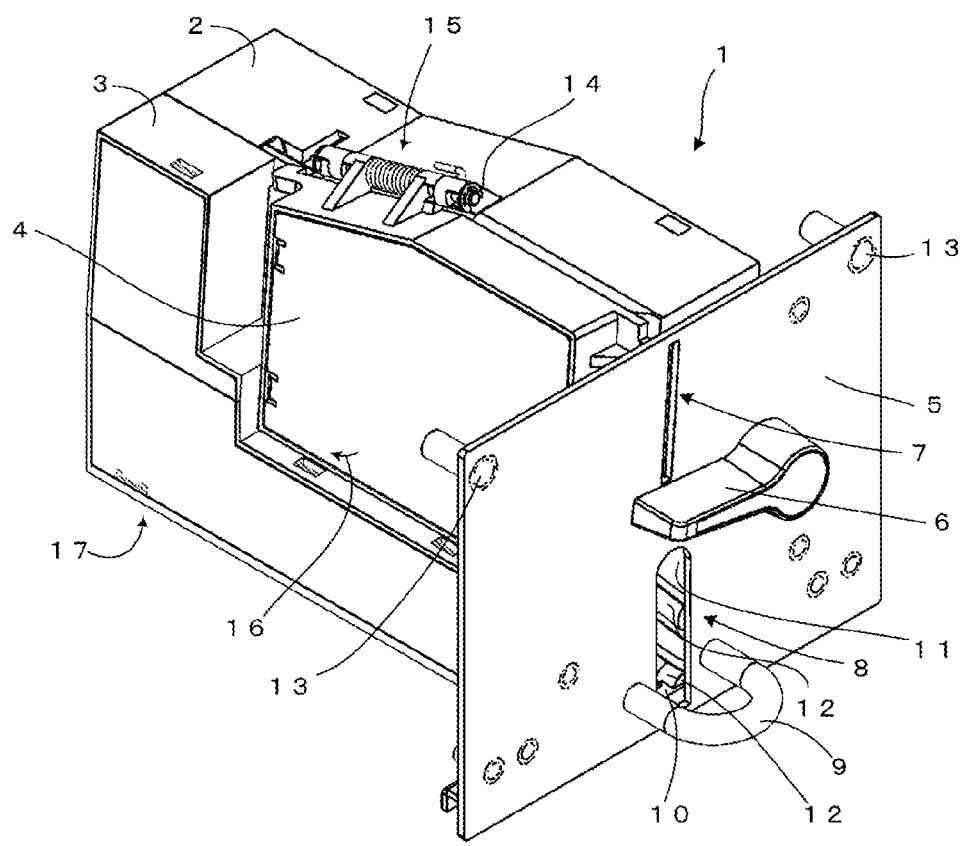
FIG. 1 is a perspective view showing an appearance of a coin selector.

Hereinafter, an embodiment of the invention will be described in detail with reference to the drawings. The drawings are merely schematic views such that the invention can be fully understood. Therefore, the invention is not limited to the shown examples. In the following drawings, common components and the same components are denoted by the same reference numerals, and redundant descriptions thereof are omitted.

A coin selector that detects the authenticity and denomination of a coin and changes the discharge destination of the coin based on a detection result will be described with reference to FIGS. 1 to 16.

FIG. 1 is a perspective view showing an appearance of the coin selector.

A main body of a coin selector 1 includes a first base portion 2, a second base portion 3, and a door portion 4. The second base portion 3 is fixed to the first base portion 2. The door portion 4 is fixed to the first base portion 2 by a hinge 15. The door portion 4 pivots about a hinge shaft 14. In FIG. 1, the hinge 15 is disposed on an upper portion of the first base portion 2. The door portion 4 is opened in a direction indicated by an arrow 16 indicating an opening direction of a door. By opening or closing the door portion 4, a lower side of the door portion 4 separates from or comes into contact with the first base portion 2. When the door portion 4 is opened, a gap is defined between the door portion 4 and the first base portion 2. A coin is dropped from the gap into a coin passage connected to a dispensing port 8. The dropped coin is discharged from the dispensing port 8. The coin passage includes a bottom portion and side walls disposed at both sides of the bottom portion. The coin rolls toward the dispensing port 8 while being supported by the side wall on the bottom portion of the coin passage. A second coin support path 10 constituting a part of the coin passage is disposed at the dispensing port 8 side of the coin passage. A first side wall 11 is provided on the first base portion 2 on a side of the coin passage including the second coin support path 10. In addition, the second base portion 3 and the door portion 4 are provided with a side wall facing the first side wall 11. Side walls are provided on both sides of the coin passage to guide the coin to the dispensing port 8. The first side wall 11 is provided with guide protrusions 12. The guide protrusions 12 reduce a contact area between the first side wall 11 and the coin, and prevents the coin from sticking to the first side wall 11.

A plate 5 is fixed to the first base portion 2 and the second base portion 3 on a front side of the coin selector 1. The plate 5 is provided with an opening of a depositing port 7 from which a coin is inserted and an opening of the dispensing port 8 from which the coin is discharged. The coin selector 1 can be attached to an apparatus such as an automatic service machine by fixing the plate 5 to a housing of the apparatus with screws 13. A coin guard 9 is attached to an outside of the dispensing port 8 to prevent the discharged coin from spilling. The dispensing port 8 is disposed in a vertical direction with respect to the depositing port 7. The coin passage disposed inside the coin selector 1 is inclined, and the coin inserted from the depositing port 7 rolls in the coin passage and is discharged to the dispensing port 8 or an authentic coin storage port that will be described later.

In the coin selector 1, a side wall provided on the first base portion 2 and a side wall facing the side wall are provided on the second base portion 3 and the door portion 4. The coin entered from the depositing port 7 moves along the side walls on both sides. The first base portion 2 and the door portion 4 are provided with a coin movement path in which a peripheral surface of a coin is in contact with the path and the coin rolls. The coin passage is formed by the movement path and the side walls disposed at both sides of the movement path.

A coin discharge mechanism, which will be described later, operates in conjunction with the rotation of a cancel lever 6. The coin discharge mechanism discharges a coin clogged in the coin passage to the dispensing port 8. The cancel lever 6 is disposed between the depositing port 7 and the dispensing port 8. By disposing the cancel lever 6 in a vicinity of the depositing port 7 or the dispensing port 8, a user can immediately cope with the occurrence of a coin clogging. The cancel lever 6 is provided between the depositing port 7 and the dispensing port 8 of the plate 5.

Figure 2:
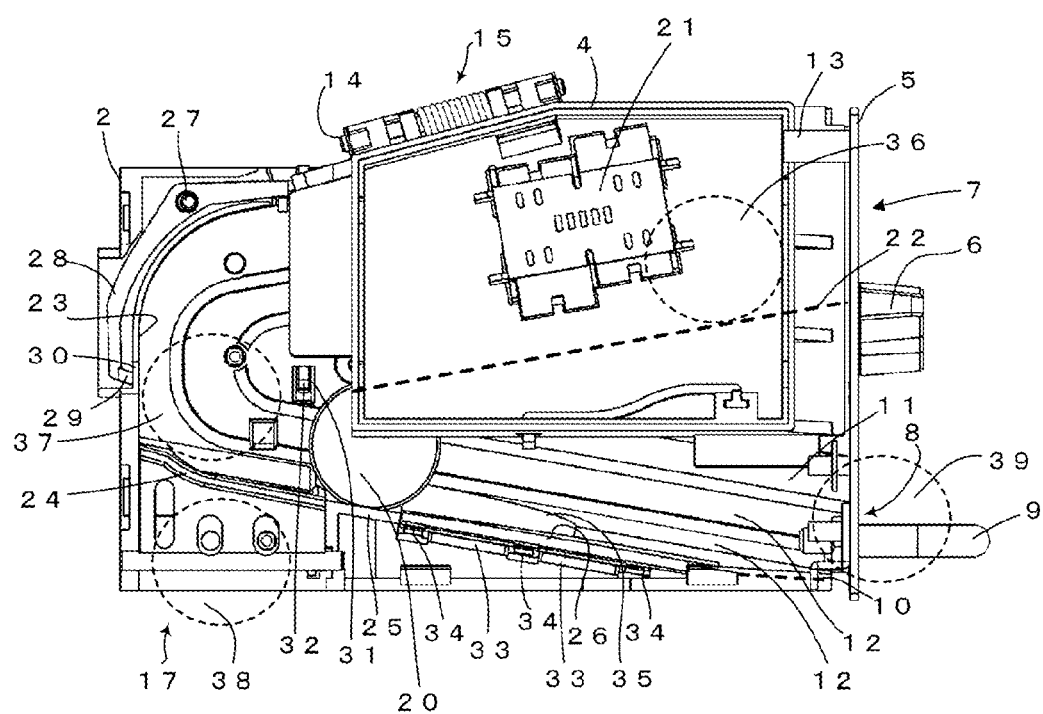
FIG. 2 shows a state in which a second base portion is removed in order to show an internal configuration of the coin selector.

FIG. 2 shows a state in which the second base portion is removed in order to show an internal configuration of the coin selector. The door portion 4 is in a closed state. FIG. 2 shows a state in which a cover on the outside of the door portion 4 is removed.

A coin enters from the depositing port 7 and is discharged from the dispensing port 8 or an authentic coin storage port 17. The coin passage through which the coin inserted from the depositing port 7 reaches the dispensing port 8 is defined by the first base portion 2, the second base portion 3, and the door portion 4. A gate 24 branches a course of the coin inserted from the depositing port 7. The course of the coin is divided into the dispensing port 8 and the authentic coin storage port 17.

A first detection sensor 21 that identifies the authenticity and the denomination of the deposited coin is disposed to the door portion 4. A second detection sensor (not shown) is disposed at a position of the first base portion 2 while facing the first detection sensor 21. Sensors that detect features of the coin passing through the coin passage are disposed at both side walls of the coin passage.

A first guide path 22 shown by a broken line is provided in a portion of the door portion 4 facing the first base portion 2. The first guide path 22 is inclined with respect to a horizontal direction, and is higher on a depositing port 7 side and lower as a distance from the depositing port 7 increases. The coin inserted from the depositing port 7 is in contact with the first guide path 22 at the peripheral surface thereof, and rolls along the first guide path 22 between a side surface of the door portion 4 and a side surface of the first base portion 2. The coin moves while being supported by the side surface of the door portion 4 and the side surface of the first base portion 2. The side surface of the door portion 4 and the side surface of the first base portion 2 constitute the side walls of the coin passage.

The coin inserted into the depositing port 7 moves along the first guide path 22, and when the coin reaches a detection range of the first detection sensor 21 and the second detection sensor, the detection of the features of the coin is started by the first detection sensor 21 and the second detection sensor. For example, when the coin reaches a first position 36 indicated by a broken line, the detection of the features of the coin is started by the first detection sensor 21 and the second detection sensor, and the detection of the features of the coin is continued until the coin moves out of the detection range. The authenticity and denomination of the inserted coin are determined based on a detection result by a control circuit (not shown). The first detection sensor 21 and the second detection sensor constitute an identification unit that identifies the denomination including the authenticity of the coin.

The inserted coin moves along the first guide path 22 and falls from an end portion of the first guide path 22. The coin is accelerated by the inclination of the first guide path 22 and falls toward an outer peripheral wall 23 side of the first base portion 2. For example, the coin dropped away from the end portion of the first guide path 22 moves to a second position 37 of the coin.

The gate 24 is provided in the middle of the coin passage. An operation of the gate 24 is controlled by the above-described control circuit (not shown). When the inserted coin has a predetermined denomination, the gate 24 is opened, and when the inserted coin has a denomination other than the predetermined denomination or a fake coin, the gate 24 is closed.

The authenticity and denomination of the coin are determined from the first detection sensor 21 and the second detection sensor detect the features of the coin until the coin falls from the first guide path 22. The opening and closing of the gate 24 are controlled based on the determination result. When it is determined that the inserted coin has the predetermined denomination, the gate 24 is opened, and the coin falls to the authentic coin storage slot 17 side as indicated by a third position 38 of the coin. When it is determined that the inserted coin is a coin of a denomination other than the predetermined denomination, the gate 24 is closed. The coin passage from the gate 24 to the dispensing port 8 is disposed such that the gate 24 side is higher than the dispensing port 8 side in the vertical direction. The coin rolls down toward a coin 20 indicated by a solid line due to gravity. The coin 20 is then discharged from the dispensing port 8 as indicated by a fourth position 39 of the coin. The coin 20 is held by the coin guard 9 without spilling from the dispensing port 8.

The movement path with which the peripheral surface of the coin in the coin passage from the gate 24 to the dispensing port 8 comes into contact is disposed in an order of the gate 24, a first coin support path 25, a flap 26, and the second coin support path 10. The first side wall 11 of the first base portion 2 and a side surface of the second base portion 3 or the door portion 4 define a side surface of the coin passage from the gate 24 to the dispensing port 8. From the gate 24 to the dispensing port 8, the coin passes through the gate 24, the first coin support path 25, the flap 26, and the second coin support path 10 in this order between the first side wall 11 and the side surface of the second base portion 3 or the door portion 4, and reaches the dispensing port 8.

The first side wall 11 is provided with the guide protrusions 12 to reduce the contact area with the coin. A plurality of guide protrusions 12 protrude from the first side wall 11 and are provided along a moving direction of the coin.

The first base portion 2 is provided with flap support portions 33 and flap shaft support portions 34 that support the flap 26. A columnar portion is provided on a side surface of the flap 26 on one side and is pivotally held by the flap shaft support portions 34. The flap support portions 33 are provided on the first base portion 2, and the flap 26 is placed on the flap support portions 33. The flap support portions 33 are plate-shaped members having flat portions in contact with the flap 26. The flap support portions 33 may have, for example, a columnar shape as long as the flap support portions 33 can support the flap 26. Since the coin moves on the flap 26 and falls on the flap 26, the flap support portions 33 need to be able to withstand the impact of the movement and the drop of the coin, and it is preferable that the flap support portions 33 are plate-shaped members and are in contact with the flap 26 over a wide area. The flap 26 is pivotally held on a side surface of the flap shaft support portions 34 on one side, and is placed on the flap support portions 33. The flap 26 can swing about a side surface on one side so that a side surface on the other side comes into contact with and separates from the flap support portions 33.

Cutout portions 35 of the guide protrusions 12 are inclined surfaces provided such that the height from the first side wall 11 gradually decreases in a direction away from the dispensing port 8. The side walls of the coin passage are disposed such that a portion far from the dispensing port 8 has a wider interval between the side walls than a portion close to the dispensing port 8.

A first opening 30 is an opening provided in the outer peripheral wall 23. A second opening 31 is an opening provided in the first side wall 11. A first pushing portion 29 is provided so as to be able to pass through the first opening 30 and protrude toward the coin passage. A second pushing portion 32 is provided so as to be able to pass through the second opening 31 and protrude toward the coin passage.

A first arm 28 is pivotally supported by a first shaft support portion 27 provided on the first base portion 2. A bent portion is provided at a top end of the first arm 28 to form the first pushing portion 29 that pushes the coin. The first arm 28 pivots about the first shaft support portion 27. When the first arm 28 pivots, the first pushing portion 29 provided at the top end of the first arm 28 can be inserted into and removed from the coin passage from the first opening 30. The second pushing portion 32 moves in a direction perpendicular to a sheet of FIG. 2, and the second pushing portion 32 can be inserted into and removed from the coin passage from the second opening 31.

The first pushing portion 29 can push the coin in the coin passage. The second pushing portion 32 can push the coin in the coin passage. The clogging of the coin passage can be eliminated by, for example, pushing the coin clogged in the coin passage by the first pushing portion 29 or the second pushing portion 32. The first pushing portion 29 pushes the peripheral surface of the coin toward the dispensing port 8. The second pushing portion 32 pushes a front surface or a back surface of the coin in a thickness direction of the coin. The pushed coin is released from clogging and continues moving toward the dispensing port 8. The coin stuck to the side wall is peeled off from the side wall and erected from the peripheral surface of the coin, and rolls toward the dispensing port 8 while being supported by the side wall.

When the first pushing portion 29 and the second pushing portion 32 move, the coin on the gate 24 is preferably in contact with either the first pushing portion 29 or the second pushing portion 32. A positional relationship of a protruding amount of the first pushing portion 29 from the first opening 30, a protruding amount of the second pushing portion 32 from the second opening 31, a distance between the first pushing portion 29 and the second pushing portion 32, and the like is preferably determined and set in advance by calculation or experiments. Even when the first pushing portion 29 and the second pushing portion 32 move with respect to the smallest diameter coin, the coin on the gate 24 is preferably in contact with either the first pushing portion 29 or the second pushing portion 32. It is preferable to be able to push any coin of any denomination clogged on the gate 24.

Figure 3:
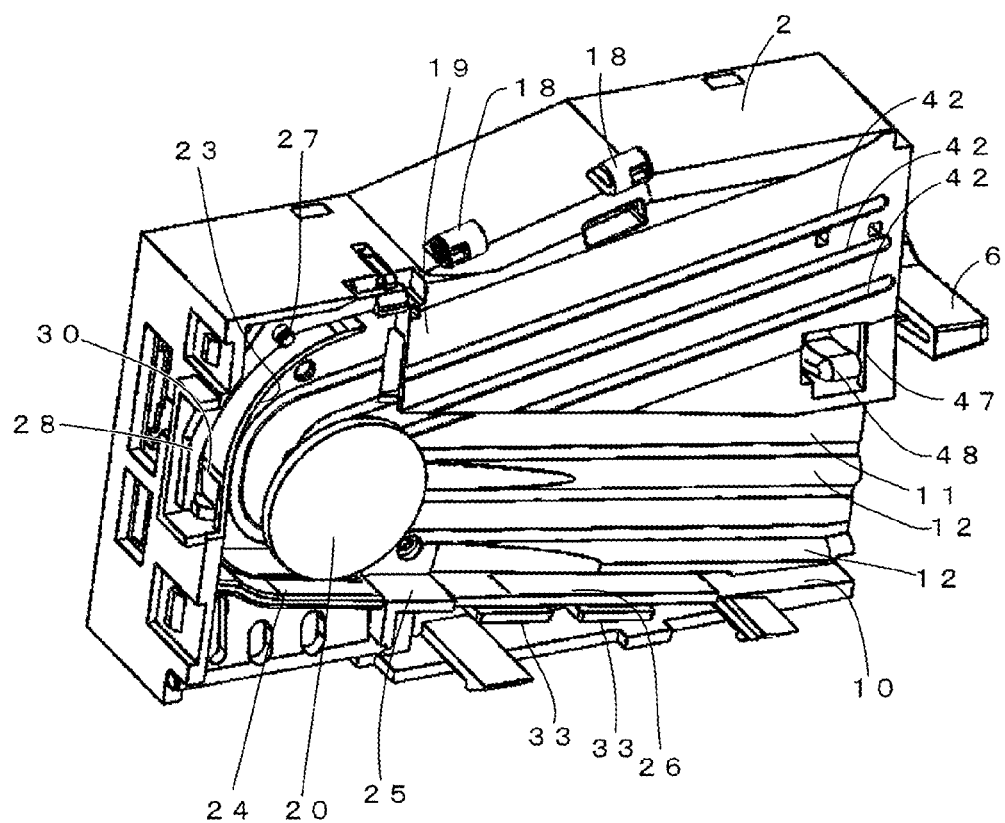
FIG. 3 is a perspective view showing a first base portion of the coin selector.

FIG. 3 is a perspective view showing the first base portion of the coin selector. This is a perspective view when viewed from the coin passage side of the first base portion 2. The first base portion 2 includes the first side wall 11 and a second side wall 19 that constitute the side surfaces of the coin passage of the coin 20. The second side wall 19 is provided at a position facing the door portion 4. The second side wall 19 protrudes from the first side wall 11 in a thickness direction of the first side wall 11. The second side wall 19 is provided with a plurality of grooves 42 along the moving direction of the coin in order to reduce a frictional force generated between the coin and the second side wall 19.

First shaft cylinders 18 are provided on the upper portion of the first base portion 2. The first shaft cylinders 18 constitute a part of the hinge 15 (see FIG. 1). The hinge shaft 14 (see FIG. 1) is inserted into the first shaft cylinders 18 together with second shaft cylinders provided in the door portion 4 (see FIG. 1) that will be described later. The door portion 4 pivots about the hinge shaft 14 as a rotation shaft with respect to the first base portion 2.

A third opening 47 is disposed in the second side wall 19. A third pushing portion 48 that pushes the door portion 4 can be inserted into and removed from the third opening 47. The third pushing portion 48 can push the door portion 4 by protruding from the third opening 47 provided in the second side wall 19, and can pivot the door portion 4 in a direction away from the second side wall 19 with the hinge shaft 14 as the rotation shaft.

Figure 4:
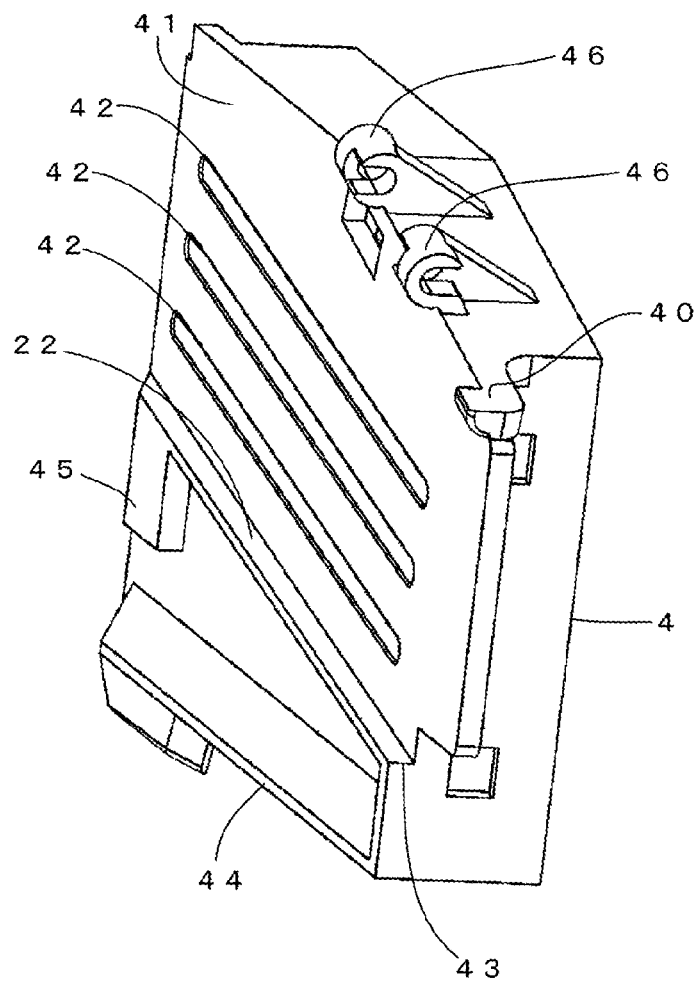
FIG. 4 is a perspective view of a door portion of the coin selector.

FIG. 4 is a perspective view of a door portion of the coin selector. This is a perspective view of the door portion 4 when viewed from the coin passage side. The door portion 4 is provided with a third side wall 41 that constitutes the side wall of the coin passage. The third side wall 41 is provided at a position facing the first base portion 2. The third side wall 41 is provided with the plurality of grooves 42 along the moving direction of the coin in order to reduce a frictional force generated between the coin and the third side wall 41. The first guide path 22 erected from the third side wall 41 is provided in a lower portion of the third side wall 41. A portion of the first guide path 22 in contact with the peripheral surface of the coin is substantially perpendicular to the third side wall 41. The first guide path 22 protrudes from the third side wall 41. At a position corresponding to the third pushing portion 48 at one end of the first guide path 22, an abutting portion 45 that abuts against the third pushing portion 48 protrudes from an end of the third side wall 41 as the first guide path 22.

A first guide path end portion 43 is disposed at the other end of the first guide path 22. The one end of the first guide path 22 is an end portion on the coin depositing port 7 side, and the other end thereof is an end portion on the dispensing port 8 side in the moving direction of the coin. The first guide path end portion 43 is the end of the first guide path 22. The first guide path 22 extends downward from the first guide path end portion 43, and a first coin guide 44 is provided at a lower portion of the door portion 4. Similarly to the first guide path 22, the first coin guide 44 protrudes from the third side wall 41. The first coin guide 44 faces the first side wall 11 of the first base portion 2. The first side wall 11 and the first coin guide 44 support the moving coin from both sides and guide the coin in the coin passage.

Second shaft cylinders 46 constituting a part of the hinge 15 are provided on an upper portion of the door portion 4. The hinge shaft 14 (see FIG. 1) is inserted into the second shaft cylinders 46 together with the first shaft cylinders 18, and the door portion 4 can be swung with respect to the first base portion 2 with the hinge shaft 14 as the rotation shaft. The door portion 4 is connected to the first base portion 2 so that a lower side of the door portion 4 can be opened and closed. A cam portion 40 protruding from the third side wall 41 is provided in the upper portion of the door portion 4. The cam portion 40 pivots in response to the swing of the door portion 4. An inclined surface is formed on a surface of the cam portion 40.

Figure 5:
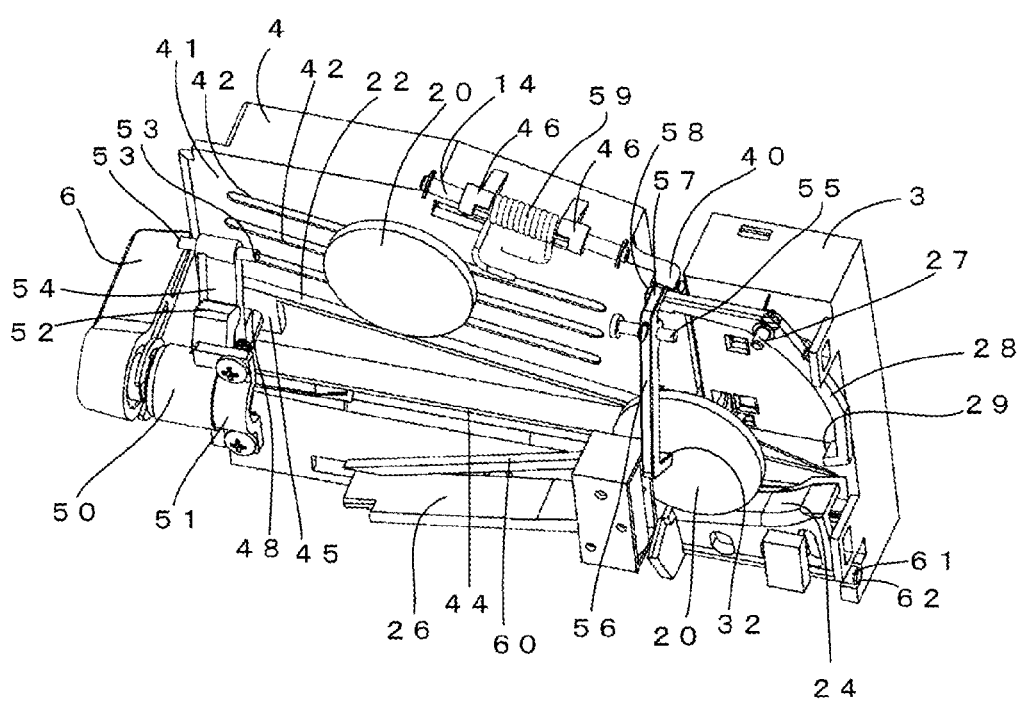
FIG. 5 is a perspective view of the second base portion and the door portion of the coin selector.
Figure 6:
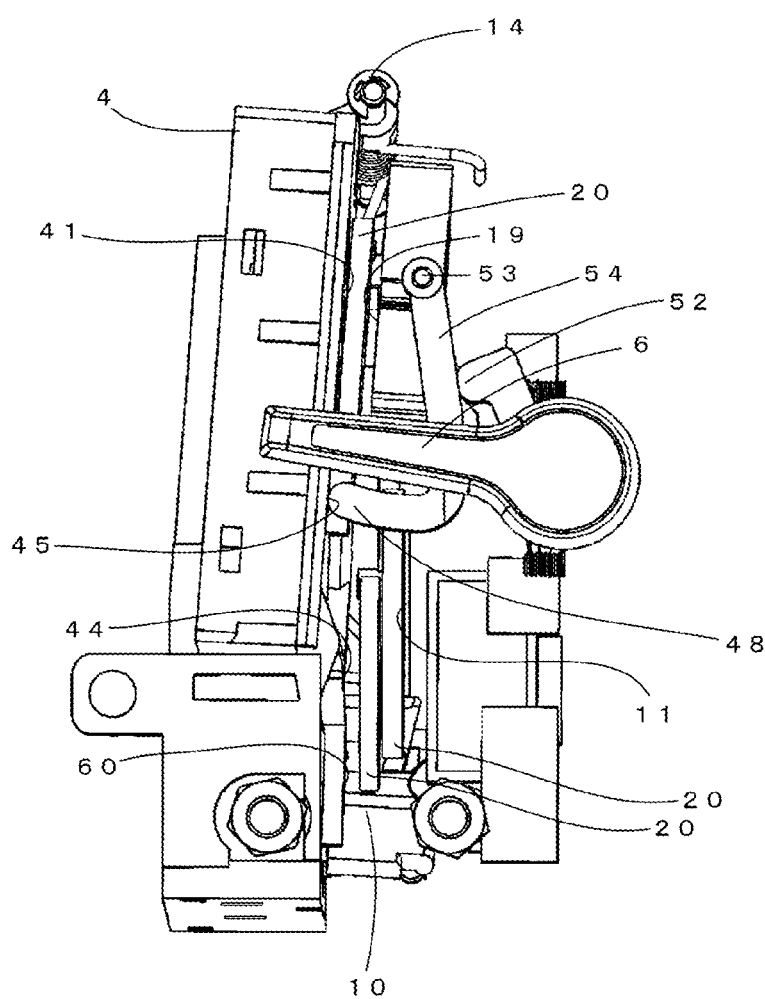
FIG. 6 is a cross-sectional view showing an opening and closing operation of the door portion of the coin selector.
Figure 11:
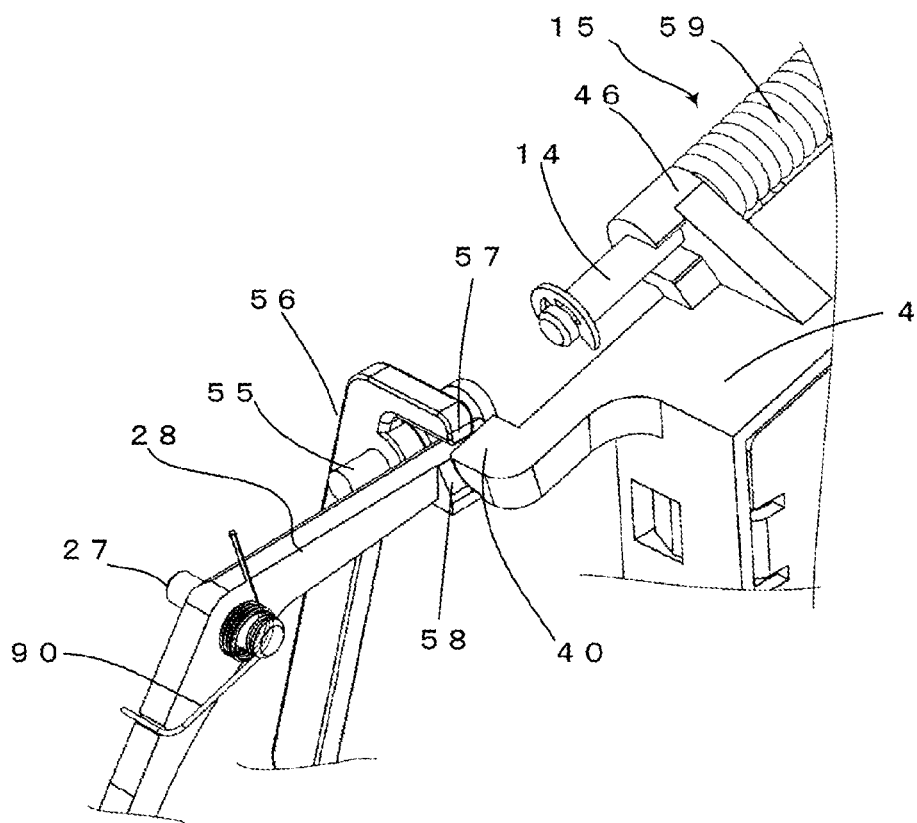
FIG. 11 is an enlarged view showing a portion of a drive mechanism of a coin discharge mechanism of the coin selector.

Next, an opening and closing operation of the door portion 4 will be described with reference to FIGS. 5, 6, and 11. FIG. 5 is a perspective view of the second base portion and the door portion of the coin selector. This is a perspective view when viewed from coin passage sides of the second base portion 3 and the door portion 4. FIG. 6 is a front view of the coin selector showing the opening and closing operation of the door portion of the coin selector. FIG. 11 is an enlarged view showing a portion of a drive mechanism of the coin discharge mechanism of the coin selector.

A second coin guide 60 is provided on the coin passage side of the second base portion 3. The second coin guide 60 faces the first side wall 11 of the first base portion 2. The second coin guide 60 is provided on the second base portion 3 below the first coin guide 44 along the moving direction of the coin 20. The second coin guide 60 reduces a frictional force generated between the second base portion 3 and the coin 20 moving in a section of the flap 26 from the gate 24.

The coin selector 1 is provided with a transmission unit that transmits a force applied to the cancel lever 6 to the first pushing portion 29 and the second pushing portion 32. The transmission unit will be described. A door spring 59 constitutes a part of the hinge 15. The door spring 59 is biased to the door portion 4 in a closing direction with respect to the first base portion 2. A bearing 50 is fixed to the first base portion 2 with screws by a fixing portion 51. The bearing 50 pivotally supports the rotation shaft of the cancel lever 6. A projection 52 is fixed to the rotation shaft of the cancel lever 6. The projection 52 moves in conjunction with the rotation of the cancel lever 6 in the rotation direction.

The third pushing portion 48 is formed at a top end of one end side of a third arm portion 54. A third support shaft 53 is formed on the other end side of the third arm portion 54. The third pushing portion 48 is pushed by the projection 52 to pivot about the third support shaft 53 as a rotation shaft, and pushes the abutting portion 45. The abutting portion 45 is pushed by the third pushing portion 48, and the door portion 4 is opened against the door spring 59 that biases the door portion 4 in the closing direction.

In accordance with the opening and closing operation of the door portion 4, the cam portion 40 provided in the door portion 4 moves. The cam portion 40 abuts against a first cam follower portion 58 provided at the top end of the first arm 28. As the cam portion 40 moves, an abutting position between the cam portion 40 and the first cam follower portion 58 changes. The first arm 28 pivots about the first shaft support portion 27 in accordance with the abutting position between the cam portion 40 and the first cam follower portion 58. The first arm 28 is pivotally supported by the first shaft support portion 27. The first arm 28 is biased by an arm spring 90 in a direction in which the first pushing portion 29 protrudes from the first opening 30. When the door portion 4 is closed, the first pushing portion 29 does not protrude from the first opening 30 against the force of the arm spring 90. When the door portion 4 transitions from a closed state to an open state, the door portion 4 transitions while the abutting position between the cam portion 40 and the first cam follower portion 58 changes. In accordance with the abutting position between the cam portion 40 and the first cam follower portion 58, the first arm 28 pivots in a direction in which the first pushing portion 29 protrudes from the first opening 30.

The first cam follower portion 58 of the first arm 28 abuts against a second cam follower portion 57 provided at a top end of a second arm 56.

The second arm 56 is pivotally supported by a second shaft support portion 55, and is biased by a spring (not shown) such that the second pushing portion 32 does not protrude from the second opening 31. When the door portion 4 is closed, the second pushing portion 32 is at a position where the second pushing portion 32 does not protrude from the second opening 31. When the door portion 4 transitions from the closed state to the open state, the first cam follower portion 58 of the first arm 28 moves upward in a sheet of FIG. 5. As the first cam follower portion 58 moves upward, the second cam follower portion 57 is pushed up, and the second arm 56 pivots about the second shaft support portion 55. As a result, the second pushing portion 32 moves in a direction protruding from the second opening 31.

When the door portion 4 is moved from the open state to the closed state, a reverse operation of the above-described operation is performed, and the first pushing portion 29 and the second pushing portion 32 return to an inside of the first opening 30 and the second opening 31, respectively.

The gate 24 is pivotally supported by a gate bearing 62 disposed on the second base portion 3. A gate shaft 61 corresponding to the gate bearing 62 is formed in the gate 24. The gate 24 pivots about the gate shaft 61 as a rotation shaft. The gate 24 is opened and closed by a driving unit (not shown). When the gate 24 is closed, the coin 20 is guided toward the flap 26. The gate 24 pivots about the gate shaft 61 as a rotation shaft in a direction away from the first base portion 2. When the gate 24 is opened, a gap is defined between the gate 24 and the first base portion 2. The coin 20 falls between the gate 24 and the first base portion 2. A course of the coin 20 changes according to the opening and closing of the gate 24.

By rotating the cancel lever 6 leftward, the abutting portion 45 is pushed by the third pushing portion 48, and the door portion 4 moves in a direction away from the second side wall 19 with the hinge shaft 14 as a center of rotation. A gap is defined between the first guide path 22 and the second side wall 19, and the coin 20 falls toward the flap 26 and the second coin support path 10.

When the cancel lever 6 is rotated leftward, the first arm 28 and the second arm 56 operate in conjunction with the opening operation of the door portion 4, and the first pushing portion 29 and the second pushing portion 32 protrude from the first opening 30 and the second opening 31, respectively. When the first pushing portion 29 abuts against the coin 20, the coin 20 is pushed and moved. When the second pushing portion 32 abuts against the coin 20, the coin 20 is pushed and moved.

When the cancel lever 6 is rotated, each element coupled to the cancel lever 6 is driven. However, the invention is not limited thereto, and each element coupled to a button or the like may be driven using a force when the button or the like is pushed. Each element coupled by an electrical element such as a solenoid and a motor may be driven.

The flap 26, the first coin support path 25, and the second coin support path 10 are disposed at a vertical direction side of the door portion 4. When the door portion 4 is opened in conjunction with the cancel lever 6, the coin clogged between the door portion 4 and the second side wall 19 falls onto the flap 26, the first coin support path 25, and the second coin support path 10. In some cases, the coin may fall onto the gate 24. Thereafter, the dropped coin rolls down toward the dispensing port 8. The flap 26, the first coin support path 25, and the second coin support path 10 are disposed downstream of the gate 24 in the moving direction of the coin. The coin moves from the gate 24 toward the dispensing port 8 on the flap 26, the first coin support path 25, and the second coin support path 10. The coin passing between the door portion 4 and the second side wall 19 and clogged on the gate 24 is protruded by the first pushing portion 29 or the second pushing portion 32 in conjunction with the operation of the cancel lever 6, and rolls toward the dispensing port 8. Since the door portion 4 is opened and closed by operating the cancel lever 6, the entire coin selector 1 vibrates, and the clogged coin can be shaken. The shaken coin passes through the coin passage and moves to the dispensing port 8.

Figure 7:
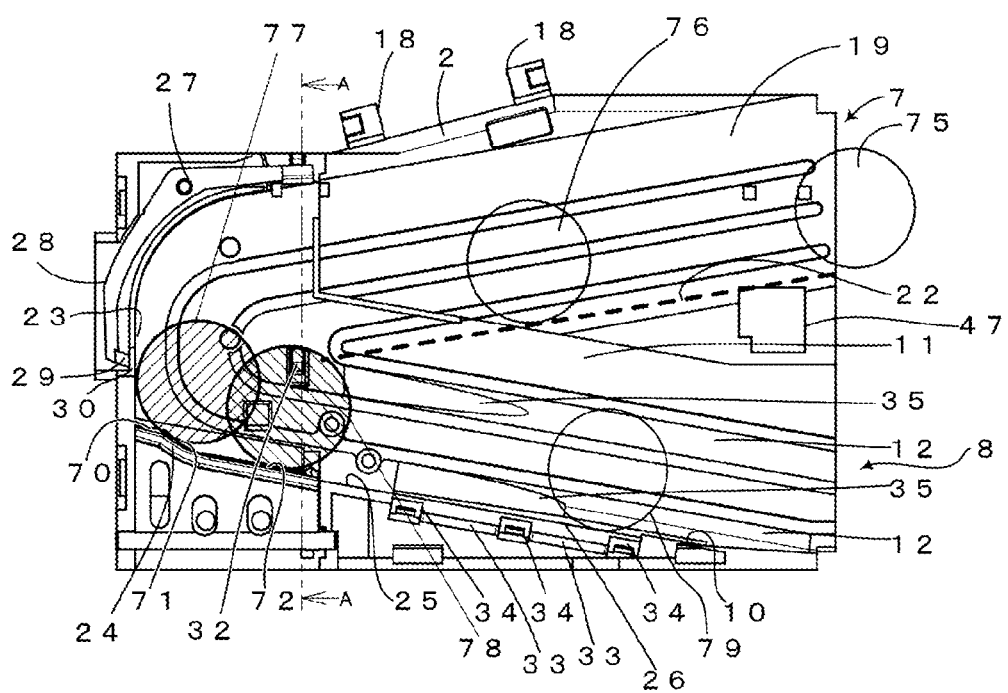
FIG. 7 shows a first example of the movement of a coin in the coin selector.
Figure 8:
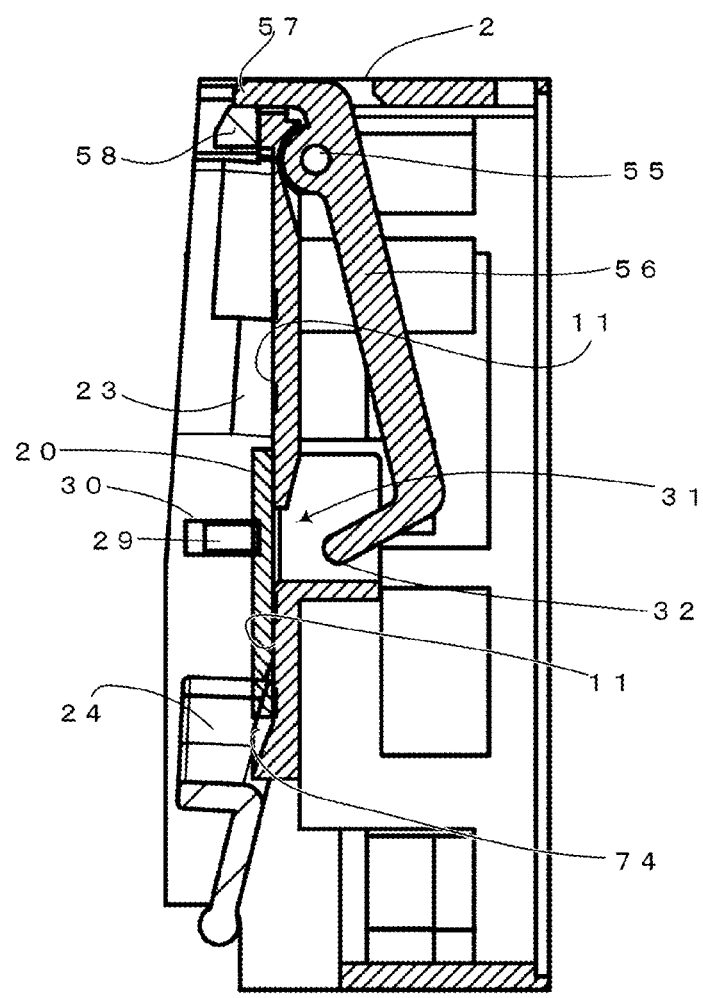
FIG. 8 is a cross-sectional view of a portion taken along a line A-A of FIG. 7.
Figure 9:
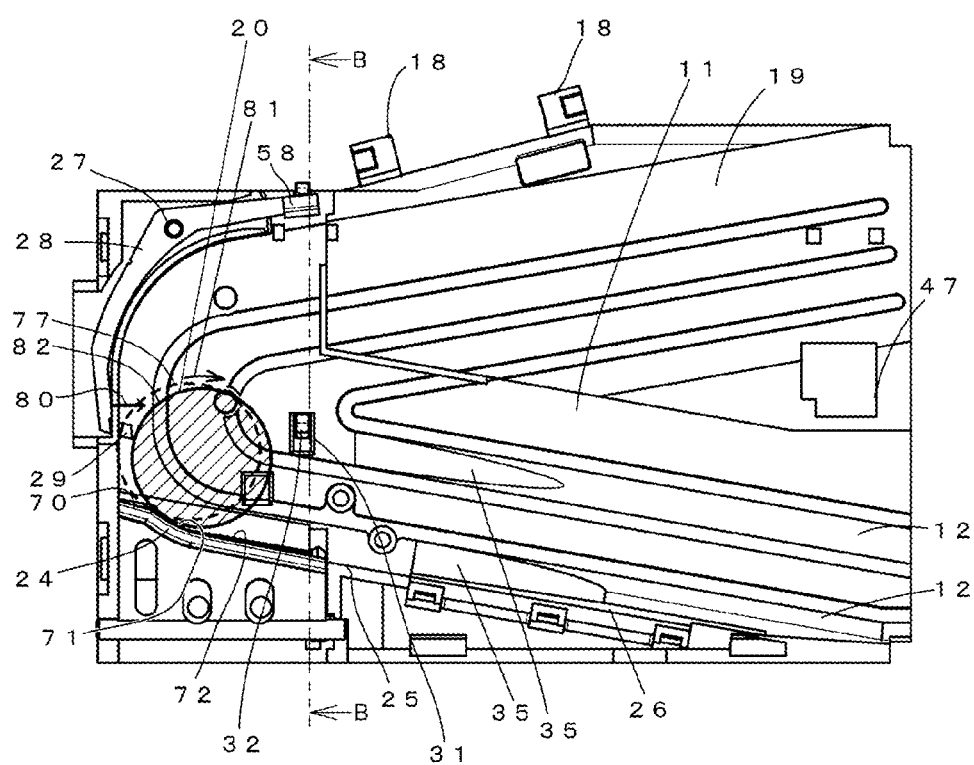
FIG. 9 shows a second example of the movement of a coin in the coin selector.
Figure 10:
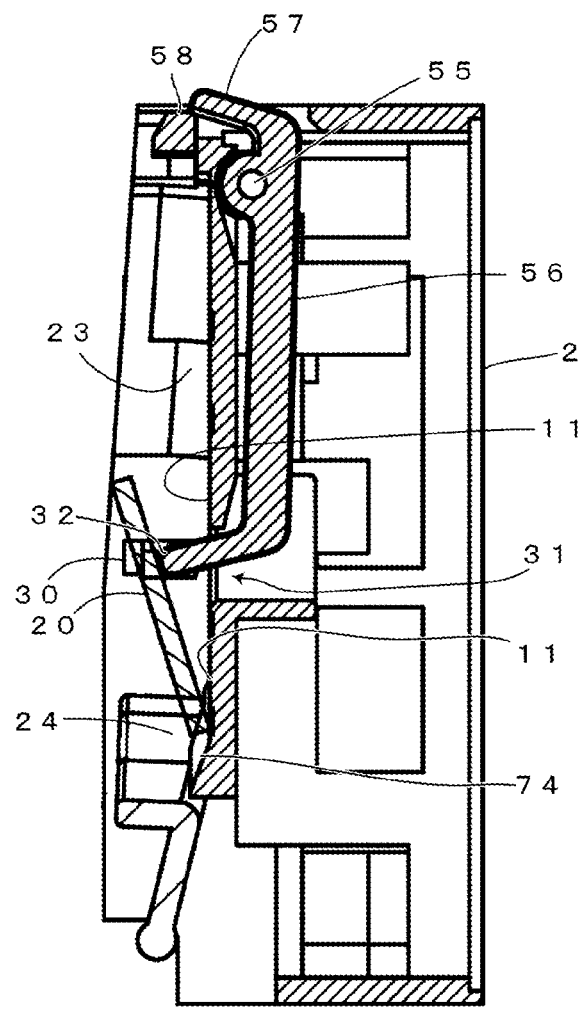
FIG. 10 is a cross-sectional view of a portion taken along a line B-B of FIG. 9.

Next, with reference to FIGS. 7 to 10, an operation of eliminating the coin clogging between the depositing port 7 and the gate 24 will be described. The operation of eliminating the coin clogging is performed in a state where the gate 24 is closed. FIG. 7 shows a first example of the movement of a coin in the coin selector. FIG. 8 is a cross-sectional view of a portion taken along a line A-A of FIG. 7. FIGS. 7 and 8 show a case where the door portion 4 is closed. FIG. 9 shows a second example of the movement of a coin in the coin selector. FIG. 10 is a cross-sectional view of a portion taken along a line B-B of FIG. 9. FIGS. 9 and 10 show a case where the door portion 4 is open.

A fifth position 75 of the coin indicates a position of the coin immediately after being inserted from the depositing port 7. A sixth position 76 of the coin indicates a position of the coin in which a feature for determining the denomination is detected. A sensor that detects the feature of the coin is disposed in a substantially central portion of the first guide path 22. A seventh position 77 of the coin indicates a state in which the coin falls from the first guide path 22 and is in contact with the gate 24 and the outer peripheral wall 23. An eighth position 78 of the coin indicates a state in which the coin falls from the first guide path 22 and is on the gate 24. A ninth position 79 of the coin indicates a case where the coin is on the flap 26.

A surface of the gate 24 in contact with the coin is divided into three portions including a first surface 70 of the gate, a second surface 71 of the gate, and a third surface 72 of the gate, which have different inclination angles. The inclination of the second surface 71 of the gate is steeper than that of the other portions. The first surface 70 of the gate is less inclined than the second surface 71 of the gate and shorter than the second surface 71. The third surface 72 of the gate is less inclined than the second surface 71 of the gate and longer than the second surface 71. When the gate 24 is closed, any one of the first surface 70 of the gate, the second surface 71 of the gate, and the third surface 72 of the gate is a surface that first receives the coin falling from the first guide path 22. By changing the angles and the lengths of the inclined surfaces, the coin clogging is less likely to occur. The inclination of a portion where the coin clogging is less likely to occur is made gentle.

A method for eliminating the clogging when the coin is clogged in the vicinity of the first surface 70 of the gate at the seventh position 77 of the coin indicated by a broken line in FIG. 9 will be described. When the coin is in contact with the first surface 70 and the outer peripheral wall 23 of the gate, or in the vicinity of the first surface 70 and the outer peripheral wall 23, the coin may be stuck to the side wall and be clogged. By pivoting the cancel lever 6, the first pushing portion 29 provided at the top end of the first arm 28 moves in a direction indicated by a first arrow 80. The first arrow 80 indicates a moving direction of the first pushing portion 29. The coin is pushed by the first pushing portion 29, and moves onto the second surface 71 having a steep inclined angle on the gate 24. The coin moves toward the dispensing port 8 while rotating in a direction indicated by a second arrow 81 along the inclination of the gate 24.

A method for eliminating the clogging when the coin is clogged in a vicinity of the third surface 72 of the gate at the eighth position 78 of the coin shown in FIG. 7 will be described. The coin may be stuck in contact with the first side wall 11 and be clogged. By pivoting the cancel lever 6, the second pushing portion 32 provided at the top end of the second arm 56 pushes the coin in a moving direction of the second pushing portion 32. The coin is pushed by the second pushing portion 32 and separated from the first side wall 11. The coin whose clogging is eliminated by the second pushing portion 32 rolls and moves toward of the dispensing port 8.

Here, FIG. 8 shows a state before the coin is pushed by the second pushing portion 32, and FIG. 10 shows a state after the coin is pushed by the second pushing portion 32. When the cancel lever 6 is pivoted, the first arm 28 operates in conjunction with the cancel lever 6. At this time, the first cam follower portion 58 of the first arm 28 moves upward, and the second pushing portion 32 passes through the second opening 31. The coin 20 stuck to the first side wall 11 is peeled from the first side wall 11 by the second pushing portion 32, is inclined obliquely, and rolls on the inclined coin passage toward the dispensing port 8.

When the coin is clogged in the coin passage, the lower side of the door portion 4 is opened and the first pushing portion 29 and the second pushing portion 32 are moved by moving the cancel lever 6. When there is a coin in a moving range of the first pushing portion 29 and the second pushing portion 32, the coin can be pushed and moved. The coin clogging is eliminated by the opening and closing operation of the door portion 4 and the operation of the first pushing portion 29 or the second pushing portion 32, and the coin moves again toward the dispensing port 8. Since the coin passage is inclined from the gate 24 to the dispensing port 8, the coin rolls down due to gravity.

Next, an operation of eliminating the coin clogging when a coin is clogged before reaching the dispensing port 8 after passing through the gate 24 will be described. The operation of eliminating the coin clogging is performed when the gate 24 closed, and is performed in conjunction with the operation of the cancel lever 6.

Figure 12:
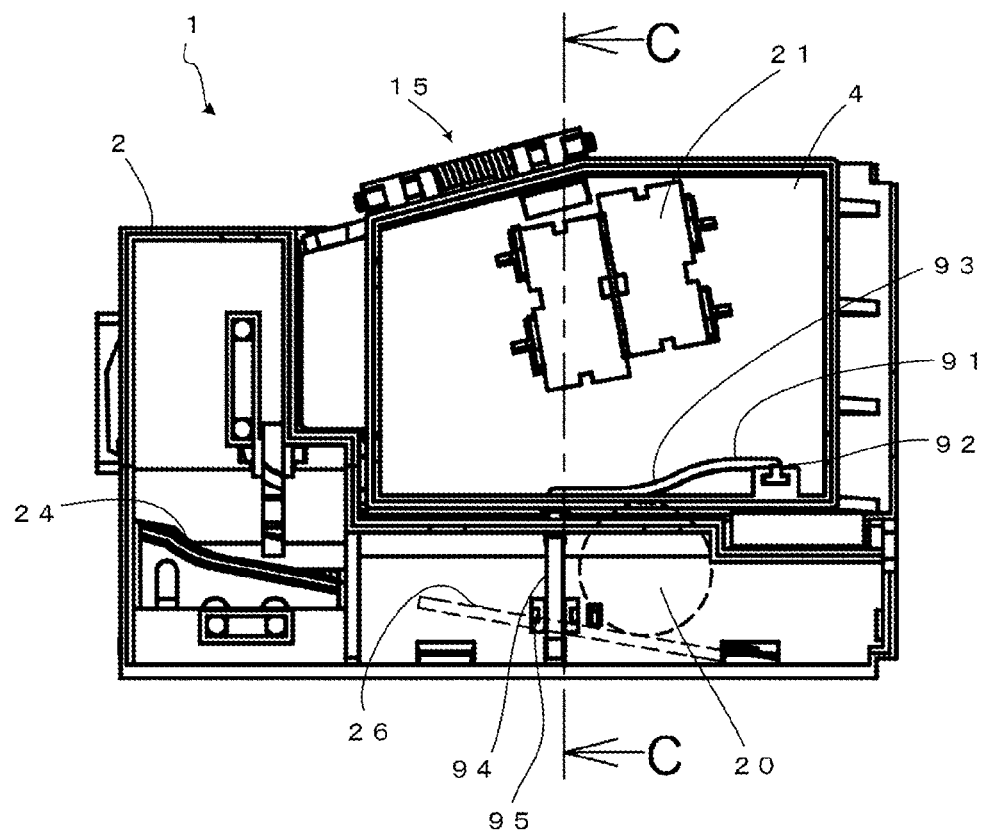
FIG. 12 shows a third example of the movement of a coin in the coin selector.

First, an outline will be described with reference to FIG. 12. FIG. 12 shows a third example of the movement of the coin in the coin selector. FIG. 12 shows an internal configuration of the coin selector 1 with a part of an outer case removed. FIG. 12 shows a state in which the coin 20 is placed on the flap 26.

A flap driving piece 94 for shaking the flap 26 is pivotally supported by a flap shaft portion 95. The flap driving piece 94 pivots about the flap shaft portion 95 in a direction perpendicular to a sheet of FIG. 12. A top end of the flap driving piece 94 is in contact with a top end of a pushing arm 91 disposed on the door portion 4. An arm fixing portion 92 on the other end side of the pushing arm 91 is fixed to the door portion 4. The pushing arm 91 has a curved portion 93 disposed at a central portion thereof. The pushing arm 91 has a spring property by the curved portion 93. The spring property can be imparted by the curved portion 93 in a direction in which the top end of the pushing arm 91 comes into contact with and separates from the flap driving piece 94.

By opening and closing the door portion 4, the top end of the pushing arm 91 comes into contact with and separates from the flap driving piece 94. The flap driving piece 94 pivots about the flap shaft portion 95 in response to the contact and separation between the pushing arm 91 and the flap driving piece 94. In response to this pivoting operation, the flap driving piece 94 pushes and moves the flap 26. Since the flap 26 is swung, the coin on the flap 26 is swung and rolls toward the dispensing port 8 along the inclination of the coin passage.

Figure 13:
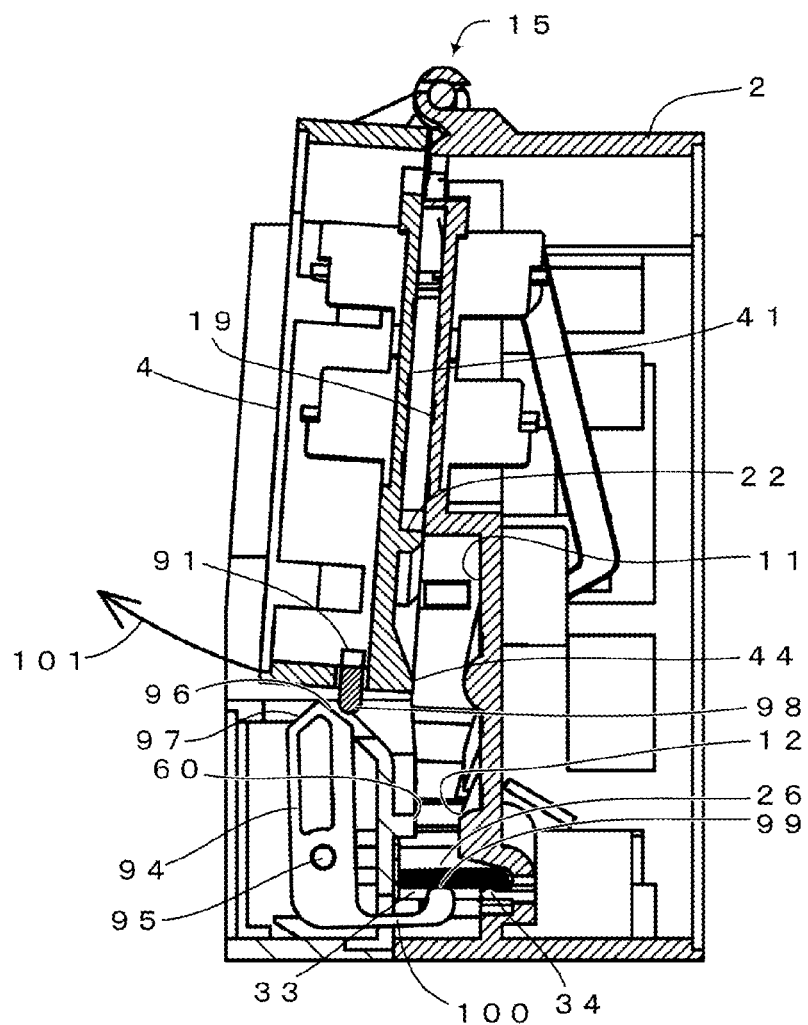
FIG. 13 is a cross-sectional view of a portion taken along a line C-C of FIG. 12.
Figure 14:
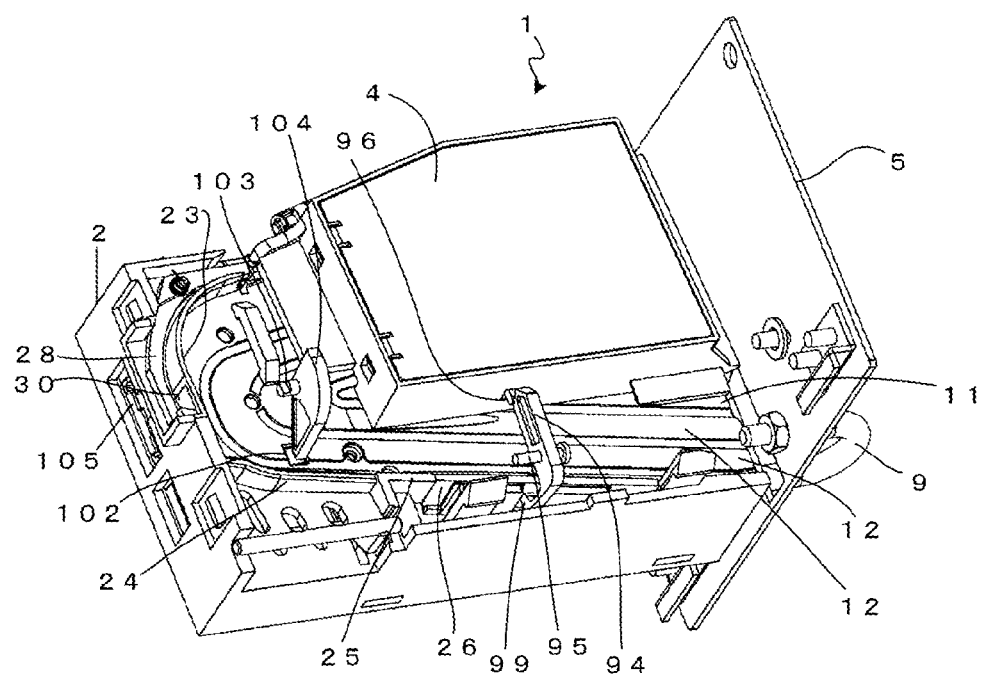
FIG. 14 is a perspective view from the rear of the coin selector.

Next, operations of the flap driving piece 94 and the pushing arm 91 will be described with reference to FIGS. 13 and 14. FIG. 13 is a cross-sectional view of a portion taken along a line C-C of FIG. 12. FIG. 14 is a perspective view from the rear of the coin selector. FIG. 14 is a perspective view in which a portion necessary for showing an operation of the flap driving piece 94 is extracted.

A top end portion 98 of the pushing arm 91 protrudes outward from a lower portion of a case of the door portion 4. Since the pushing arm 91 is provided in the door portion 4, the pushing arm 91 moves in accordance with the opening and closing of the door portion 4. Since the top end portion 98 of the pushing arm 91 is biased from the inside toward the outside of the door portion 4, when a strong force is applied to the top end portion 98 of the pushing arm 91, the pushing arm 91 is curved and pushed back into the door portion 4. Therefore, the pushing arm 91 can be protected from an unexpected problem that the flap driving piece 94 is fixed without moving. The spring property of the pushing arm 91 can reduce a sudden collision force when the pushing arm 91 abuts against the flap driving piece 94, and reduce the occurrence of an unpleasant phenomenon such as an impact sound.

A top end portion on one side of the flap driving piece 94 abuts against the top end portion 98 of the pushing arm 91. A first inclined portion 96 and a second inclined portion 97 are provided at the top end portion on the one side of the flap driving piece 94. A portion where the first inclined portion 96 and the second inclined portion 97 are in contact with each other is a vertex. The vertex, a part of the first inclined portion 96 on the vertex side, and a part of the second inclined portion 97 on the vertex side are in contact with the top end portion 98 of the pushing arm 91. A flap driving arm portion 100 formed by bending the flap driving piece 94 toward the first base portion 2 is disposed at the other end side of the flap driving piece 94. A flap pushing portion 99 that is in contact with the flap 26 is provided at a top end of the flap driving arm portion 100. The flap pushing portion 99 is formed by bending the flap driving arm portion 100 toward the flap 26. The columnar portion is provided on the side surface of the flap 26 on one side and is pivotally held by the flap shaft support portions 34. A back surface side of the flap 26 is supported by the flap support portions 33. The flap 26 is pushed and moved from the back surface side by the flap pushing portion 99 with the flap shaft support portions 34 as the center of pivoting.

The flap pushing portion 99 is disposed at an approximately central portion in a longitudinal direction of the flap 26. When the flap 26 is pushed from the back surface side, only the central portion may be pushed, or a plurality of points may be pushed.

When the top end portion 98 of the pushing arm 91 abuts against the first inclined portion 96 or the second inclined portion 97, the flap driving piece 94 pivots about the flap shaft portion 95 in accordance with the inclination of the first inclined portion 96 or the second inclined portion 97, and the flap pushing portion 99 moves up and down. When the door portion 4 transitions from the closed state to the open state in a direction of an arrow 101 indicating an opening direction of the door portion 4, the top end portion 98 of the pushing arm 91 moves from a base portion of the first inclined portion 96 toward the vertex while being in contact with the first inclined portion 96. At this time, in the case of FIG. 13, the pushing arm 91 rotates leftward about the flap shaft portion 95. Thereafter, the top end portion 98 of the pushing arm 91 moves from the vertex of the second inclined portion 97 toward a base portion while being in contact with the second inclined portion 97. At this time, in the case of FIG. 13, the pushing arm 91 rotates rightward about the flap shaft portion 95. In this series of processes, in the case of FIG. 13, the flap pushing portion 99 moves up and down. Further, the flap 26 is rotated rightward about the flap shaft support portions 34 by the flap pushing portion 99, and then rotated leftward. In this way, the flap 26 swings in conjunction with an operation of the door portion 4 based on the operation of the cancel lever 6.

A position at which the top end portion 98 of the pushing arm 91 is in contact with the vertex of the flap driving piece 94 is a position at which the amount of movement of the flap pushing portion 99 is maximized. At this time, the amount of movement of the flap 26 is largest.

In the coin passage, a coin passage body 104 through which a coin can pass only in one way is disposed. The coin passage body 104 pivots about a coin passage body shaft 103. A top end of the coin passage body 104 is inserted into a coin passage opening 102 provided in the first side wall 11. The coin that passed between the first base portion 2 and the door portion 4 swings the coin passage body 104 and falls onto the gate 24. At this time, the coin passage body 104 is pushed by the falling coin, and the top end of the coin passage body 104 can move to the outside of the coin passage opening 102. However, in an opposite direction, the top end of the coin passage body 104 abuts against an edge of the coin passage opening 102 and cannot move. The coin passage body 104 can restrict the movement of the coin in the opposite direction.

A connector 105 is a connection unit that connects a power supply, a control line, and the like for controlling the coin selector 1 to a control unit disposed outside. Power supply, communication of a control signal, communication of a detection result of the sensor, and the like are performed on the coin selector 1 via the connector 105. The coin selector 1 is controlled by the control unit disposed outside.

Figure 15:
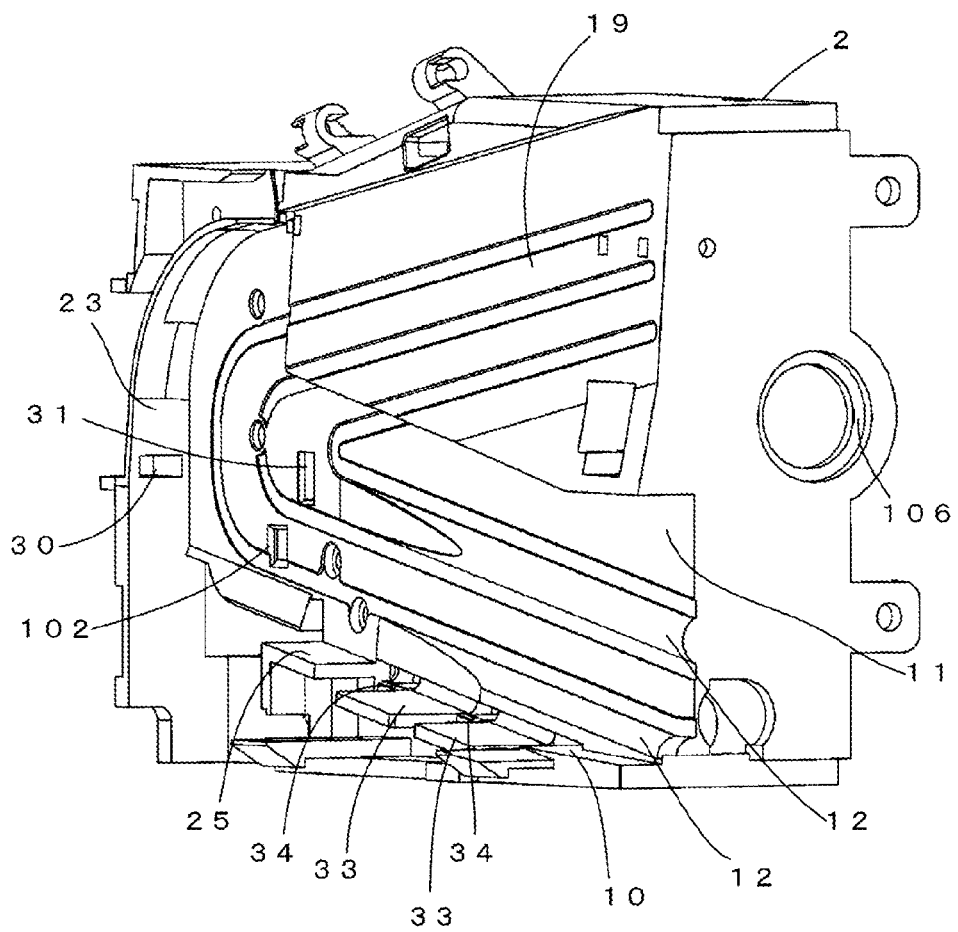
FIG. 15 is a perspective view showing a support portion of a flap of the coin selector.
Figure 16:
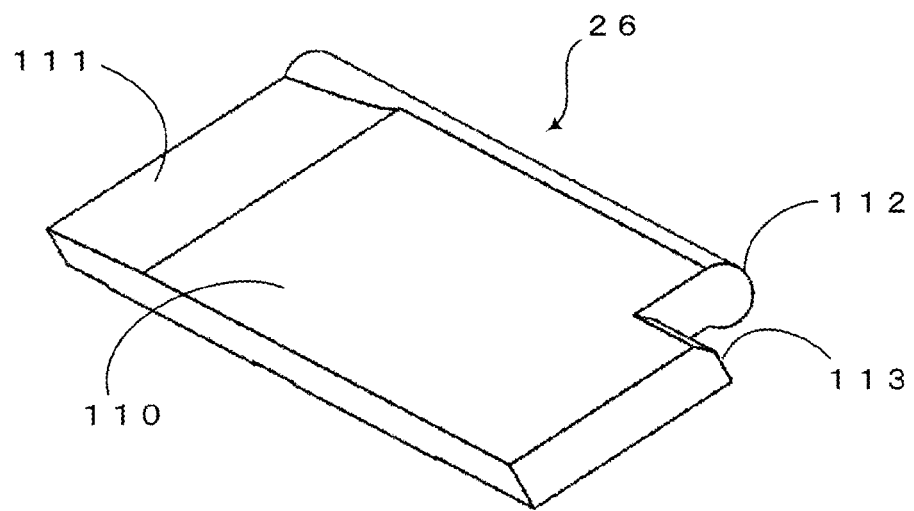
FIG. 16 is a perspective view of the flap of the coin selector.

Next, the flap 26 and a support portion of the flap 26 provided on the first base portion 2 will be described with reference to FIGS. 15 and 16. FIG. 15 is a perspective view showing the support portion of the flap of the coin selector. FIG. 16 is a perspective view of the flap of the coin selector.

A lever hole 106 is a through hole provided in the first base portion 2 into which the rotation shaft of the cancel lever 6 is inserted.

The flap support portions 33 provided on the first base portion 2 are plate-shaped projections provided on the first base portion 2. The flap 26 is placed on the flap support portions 33.

The flap 26 is a substantially rectangular flat plate, and has a flat coin placing surface 110. A flap inclined portion 111 is provided at one end of the coin placing surface 110 in a longitudinal direction. A substantially columnar protruding portion 112 is provided along the longitudinal direction on one side in a transverse direction of the flap 26. A flap cutout portion 113 is provided on the protruding portion 112 side of the other end of the flap 26 in the longitudinal direction.

Surfaces of the flap support portions 33 are at positions one step lower than the height of the surfaces of the first coin support path 25 and the second coin support path 10. This step is provided in consideration of the thickness of the flap 26. This step is disposed so as not to interfere with the rolling of the coin. The flap shaft support portions 34 are provided on a base side of the flap support portions 33 of the first base portion 2. In order not to interfere with a swinging operation of the flap 26, a recess is provided at the base side of the flap support portions 33 so as to correspond to the protruding portion 112 of the flap 26.

A plurality of flap support portions 33 are provided at intervals. The flap pushing portion 99 is inserted into and removed from the flap support portions 33 to push the back surface side of the flap 26.

The protruding portion 112 of the flap 26 is pivotally supported by the flap shaft support portions 34 so as to be swingable. The back surface side of the flap 26 is in contact with the flap support portions 33. When the cancel lever 6 is not operated, the flap 26 does not move, and the back surface side of the flap 26 is in contact with the flap support portions 33. The first coin support path 25 and the flap 26 define a step in a state where the surface of the first coin support path 25 is higher than the surface of the flap 26. The flap 26 and the second coin support path 10 define a step in a state where the surface of the flap 26 is higher than the surface of the second coin support path 10. These steps are provided so as not to interfere with the movement of the coin. When a moving direction side of the coin is raised, the moving direction side may become an obstacle to the coin moving. The flap inclined portion 111 is provided on the coin placing surface 110 so as to generate a suitable level difference only by placing the flap 26 on the flap support portions 33.

The coin passage from the first coin support path 25 to the second coin support path 10 is gradually lowered in the vertical direction from the first coin support path 25 toward the second coin support path 10. That is, the entire path of the coin passage is inclined. The coin rolls down from a higher side to a lower side due to gravity.

The coin passage from the first coin support path 25 to the second coin support path 10 is configured such that the width of the coin passage is gradually narrowed toward the second coin support path 10 by the guide protrusions 12 provided on the first side wall 11. The flap 26 is provided with the flap cutout portion 113 corresponding to the guide protrusions 12 protruding from the first side wall 11, thereby avoiding interference between components.

Figure 17:
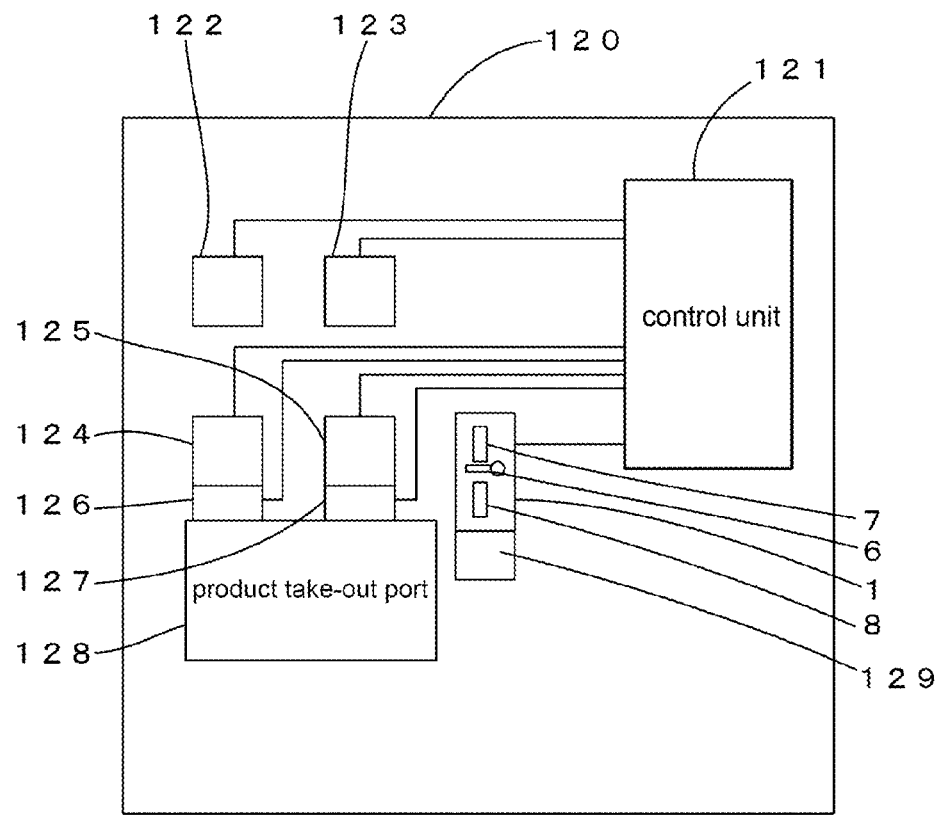
FIG. 17 shows an example of an automatic service machine.

Next, an example of an automatic service machine 120 including the coin selector 1 will be described with reference to FIG. 17. FIG. 17 shows an example of an automatic service machine.

The automatic service machine 120 is an apparatus that discharges an article in response to a predetermined fee when the fee is deposited in the coin selector 1.

The automatic service machine 120 includes a control unit 121 that controls the entire apparatus. The control unit 121 includes, for example, a CPU, and is a unit that controls each element according to a program stored in a memory.

A first button 122 and a second button 123 are connected to the control unit 121 for selecting a product. When the first button 122 or the second button 123 is operated, the control unit 121 can input a signal and recognize the operated button.

The coin selector 1 is connected to the control unit 121 and is controlled by the control unit 121. A denomination of a coin deposited from the depositing port 7 is identified and output to the control unit 121. The coin inserted into the coin selector 1 is stored in a safe 129 and a deposit amount of the coin is calculated and acquired by the control unit 121 when it is determined that the coin is normally deposited. When it is determined that the coin is an illegitimate deposit such as a fake coin, the coin will be returned to the dispensing port 8. When the coin is clogged, the cancel lever 6 is operated to eliminate the clogging, and the inserted coin can be returned to the dispensing port 8.

A first product is stored in a first product storage 124. A second product is stored in a second product storage 125. A first product gate portion 126 operates under the control of the control unit 121, and discharges the first product stored in the first product storage 124 to a product take-out port 128. A second product gate portion 127 operates under the control of the control unit 121, and discharges the second product stored in the second product storage 125 to the product take-out port 128. The first product storage 124 and the second product storage 125 constitute a storage portion that stores a product, and the product stored in the storage portion is discharged for each predetermined quantity.

A coin is inserted into the coin selector 1 as a fee for a product. The denomination of the inserted coin is identified, and the deposit amount is calculated by the control unit 121. When the deposit amount satisfies the fee of the product, the product can be selected. The product is selected by the first button 122 or the second button 123. When the first button 122 is selected, the control unit 121 controls the first product gate portion 126 to discharge the first product to the product take-out port 128. When the second button 123 is selected, the control unit 121 controls the second product gate portion 127 to discharge the second product to the product take-out port 128. The first product gate portion 126 and the second product gate portion 127 constitute a discharge portion that discharges a product from the storage portion. A user can take out a desired product from the take-out port 128.

Here, the automatic service machine 120 has been described using a machine that sells a product as an example. Alternatively, the automatic service machine 120 may be a machine that provides a service such as operating a machine such as a laundry machine or a massage machine for a predetermined time instead of the product.

What is claimed is:

1. A coin selector comprising:
   an identifier configured to identify a denomination of a coin entering from a depositing port;
   a storage port configured to discharge a coin of a predetermined denomination;
   a dispensing port configured to discharge a coin of a denomination other than the predetermined denomination;
   a gate disposed in a middle of a path along which a coin moves between the depositing port and the dispensing port, the gate branching a course of the coin to the storage port or the dispensing port; and
   a pushing portion configured to push or vibrate the coin remaining in the middle of the path along which the coin moves, after being identified by the identifier and passed through the gate, thereby moving the coin along the path toward the dispensing port, wherein
   the path has a bottom portion and side walls disposed on opposite sides of the bottom portion,
   the bottom portion is configured to be in contact with a peripheral surface of the coin,
   the side walls are configured to support the coin rolling on the bottom portion,
   a flap, inclined in the dispensing port direction, is disposed between the gate and the dispensing port and forms a portion of the bottom portion, and
   the pushing portion is disposed in the middle of the path along which the coin moves, and moves the coin by pushing and swinging the flap that supports the coin.

2. The coin selector according to claim 1, further comprising:
   a support portion configured to pivotally support the flap on one side of the flap in a lateral direction, wherein
   the pushing portion pushes the flap from a back surface side of the flap to move the coin placed on a front surface side of the flap.

3. The coin selector according to claim 2, wherein
   the flap is operated in accordance with a movement of the pushing portion in a vertical direction, and the flap returns due to an own weight thereof to a position before the flap is pushed by the pushing portion when the pushing portion is lowered.

4. The coin selector according to claim 1, further comprising:
   a cancel lever connected to the pushing portion, wherein
   the pushing portion pushes the flap in conjunction with an operation of the cancel lever.

5. The coin selector according to claim 4, wherein
   the identifier is disposed in the middle of the path along which the coin moves between the depositing port and the gate,
   the coin inserted into the depositing port moves through a coin passage, the coin passage including a first side wall that supports a surface of the coin on one side, a second side wall that supports a surface of the coin on the other side, and a guide path that is erected from the second side wall, comes into contact with a peripheral surface of the coin, and supports the coin,
   the identifier is disposed separately on the first side wall and the second side wall, and identifies a denomination of the coin moving in the coin passage,
   the first side wall is disposed on a base portion, the second side wall and the guide path are disposed on a door portion, the door portion is connected to the base portion such that the door portion is openable and closable on a lower side, and an interval between the guide path and the first side wall changes in accordance with opening and closing of the door portion,
   the door portion opens and closes in conjunction with the operation of the cancel lever,
   when the door portion is closed with respect to the base portion, the door portion and the base portion define the coin passage,
   when the door portion is opened with respect to the base portion, the coin placed on the guide path is dropped from between the guide path and the first side wall into a passage for guiding the coin to the dispensing port, and
   the flap is disposed in the passage for guiding the coin to the dispensing port.

6. The coin selector according to claim 5, wherein
   the passage for guiding the coin to the dispensing port is on a dispensing port side than the gate between the gate and the dispensing port, and is disposed on a vertical direction side of the door portion.

7. An automatic service machine comprising:
   the coin selector according to claim 1;
   a selection button configured to select a product;
   a storage portion configured to discharge a product;
   a discharge portion configured to discharge a product; and
   a controller configured to control the coin selector, the selection button, and the discharge portion, wherein
   when a deposit amount in the coin selector satisfies a fee corresponding to the product selected by the selection button, the product selected by the selection button is provided under control of the controller.

8. The coin selector according to claim 1, wherein the pushing portion is disposed in the middle of the path of the coin from the identifier to the gate.

9. The coin selector according to claim 8, wherein the pushing portion pushes the coin placed on the gate.

10. The coin selector according to claim 9, wherein the pushing portion pushes the coin toward the dispensing port.

11. The coin selector according to claim 9, further comprising:
a cancel lever connected to the pushing portion; and
a transmission portion configured to operate the pushing portion in conjunction with an operation of the cancel lever, wherein
the pushing portion pushes the coin on the gate in response to the operation of the cancel lever.

12. The coin selector according to claim 8, wherein the pushing portion pushes the coin in a thickness direction of the coin.

13. The coin selector according to claim 8, wherein
the identifier is disposed in the middle of the path along which the coin moves between the depositing port and the gate,
the coin inserted into the depositing port moves through a coin passage, the coin passage including a first side wall that supports a surface of the coin on one side, a second side wall that supports a surface of the coin on the other side, and a guide path that is erected from the second side wall, comes into contact with a peripheral surface of the coin, and supports the coin,
the identifier is disposed separately on the first side wall and the second side wall, and identifies a denomination of the coin moving in the coin passage,
the first side wall is disposed on a base portion, the second side wall and the guide path are disposed on a door portion, the door portion is connected to the base portion such that the door portion is openable and closable on a lower side, and an interval between the guide path and the first side wall changes in accordance with opening and closing of the door portion,
the door portion opens and closes in conjunction with the operation of the cancel lever,
when the door portion is closed with respect to the base portion, the door portion and the base portion define the coin passage, and
when the door portion is opened with respect to the base portion, the coin placed on the guide path is dropped from between the guide path and the first side wall into a passage for guiding the coin to the dispensing port.

14. The coin selector according to claim 13, wherein the passage for guiding the coin to the dispensing port is between the gate and the dispensing port and is disposed on a vertical direction side of the door portion.

15. An automatic service machine comprising:
the coin selector according to claim 1;
a selection button configured to select a product;
a storage portion configured to store a product;
a discharge portion configured to discharge a product; and
a controller configured to control the coin selector, the selection button, and the discharge portion, wherein
when a deposit amount in the coin selector satisfies a fee corresponding to the product selected by the selection button, the product selected by the selection button is provided under control of the controller.

16. The coin selector according to claim 1, wherein, in a state in which the identifier determines that the coin is a predetermined denomination, the gate is opened and the coin falls into a storage, and
wherein, in a state in which the identifier determines that the coin is not the predetermined denomination, the gate is closed and the coin passes through the gate.

17. The coin selector according to claim 16, wherein, in the state in which the identifier determines that the coin is the predetermined denomination, the gate is opened and the coin falls into the storage without being pushed by the pushing portion.

* * * * *